Nov. 22, 1927.  
J. W. HEETER  
1,650,273  
SWAB FOR WELLS AND METHOD OF MAKING THE SAME  
Filed Aug. 2, 1924

INVENTOR  
Joseph W. Heeter  
By Byrnes, Stebbins & Parmelee  
His Attys

Patented Nov. 22, 1927.

1,650,273

UNITED STATES PATENT OFFICE.

JOSEPH W. HEETER, OF BUTLER, PENNSYLVANIA.

SWAB FOR WELLS AND METHOD OF MAKING THE SAME.

Application filed August 2, 1924. Serial No. 729,816.

The present invention relates broadly to swabs and a method of making the same, and more particularly to swabs of the character adapted for use in connection with oil and gas wells for removing liquids therefrom.

In devices of the character herein contemplated, as heretofore constructed, it has been customary to provide a pin and valve comprising more or less readily separable sections. Due to this construction, these sections have frequently become disengaged during the use of the swab, thereby permitting the main body of the swab, including the packings, to drop off in the well. This has entailed a more or less difficult fishing operation, resulting in the loss of considerable time and money.

One of the objects of the present invention is to provide an improved swab having the pin and valve so constructed as to prevent accidental separation of the parts thereof.

In the accompanying drawings I have shown, for purposes of illustration only, a preferred embodiment of the present invention, it being understood that the drawings do not define the limits of the invention, as changes in the construction and operation thereof may be made without departing either from the spirit of the invention or the scope of my broader claims.

In the drawings:—

Figure 3:
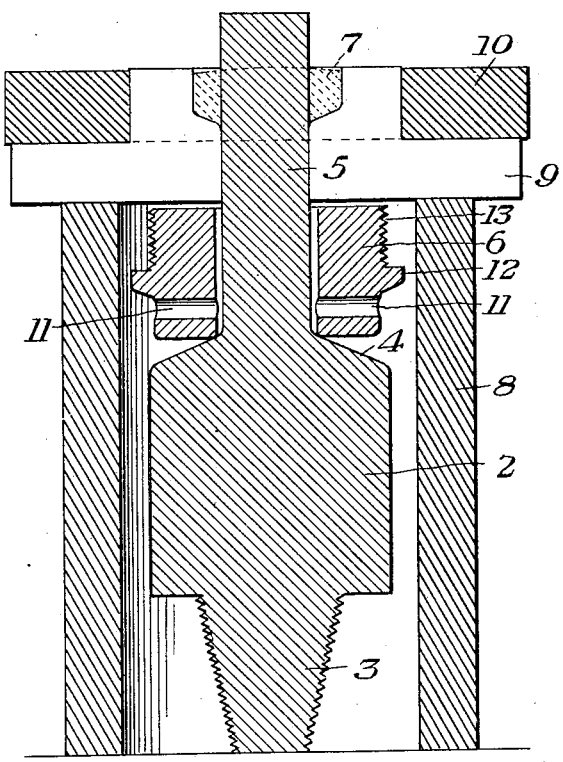
Figure 3 is a detail view, on an enlarged scale, illustrating one method of assembling the pin and valve.

In carrying out the present invention, there may be provided a pin 2 having a threaded upper end 3 adapted to permit the pin to be attached to the tools or line used for lowering the same. The end of the pin opposite the threaded portion 3 is of materially smaller diameter than the maximum diameter of the pin to provide a valve shoulder 4 and a guiding stem 5. Initially this guiding stem is of substantially uniform cross section throughout its length, as indicated in full lines in Figure 3. After the pin has been formed, a valve 6 is slipped into position thereover, and the stem 5 has an integral head 7 formed thereon, as indicated in dotted lines in Figure 3.

A convenient method of forming the integral head 7 comprises placing the pin and valve in inverted position within a sleeve 8, and then embracing the upper end of the stem in a sectional die 9, the sections of which are held in position by a unitary ring 10. After the parts are in assembled relationship, as indicated in full lines in Figure 3, the free end of the stem 5 is upset to form the head 7 conforming to the contour of the cavity within the die. This provides a permanent union between the pin and the valve preventing accidental disengagement thereof when the parts are in use.

The valve may conveniently be formed with a plurality of radially extending openings 11 extending through the upper portion thereof, and with an intermediate flange 12, below which is a threaded projection 13. This projection may be engaged by a sleeve 14 enclosing the head 7 and threaded at its lower end to receive the plug 15. This plug is in turn provided with a central aperture threaded throughout a portion of its length for the reception of the upper end of a pipe section 16 having a top flange 17, against which abuts one end of a compression spring 18. The opposite end of the compression spring engages a top washer 19, below which is positioned a packing 20 preferably of rubber. Preferably there is a second similar packing 21 supported by a bottom washer 22, the respective packings being separated by an intermediate washer 23. The parts are then held in assembled relationship by a clamping nut 24.

Figure 1:
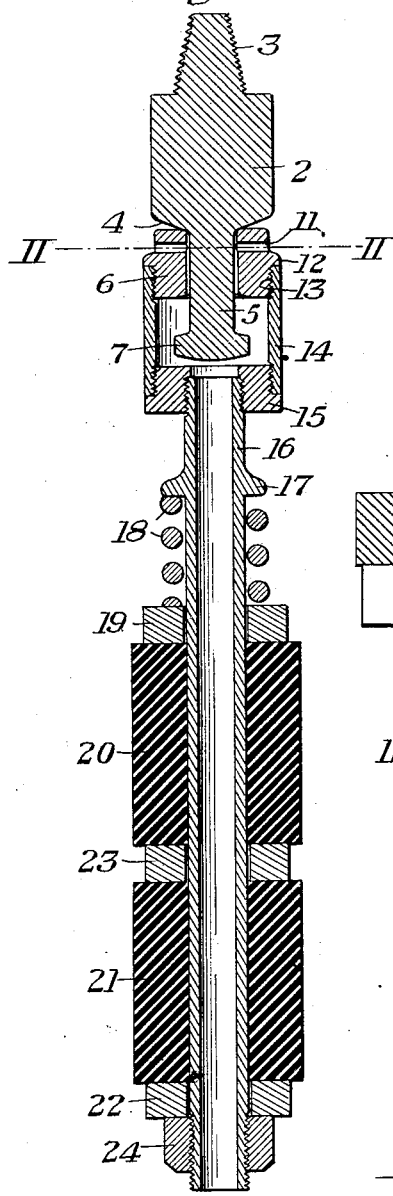
Figure 1 is a vertical sectional view through one form of swab embodying the present invention.
Figure 2:
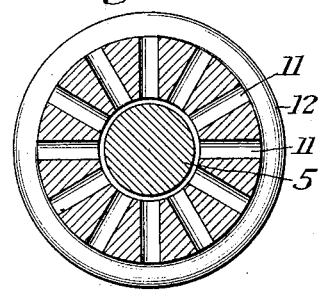
Figure 2 is a detail sectional view, on an enlarged scale, on the line II—II of Figure 1.

With the construction herein shown, it will be apparent that the swab may be lowered to the desired position within a well or other opening until it has reached the desired depth, after which any desired amount of slack may be given to the cable or line supporting the pin 2. This will permit the pin to drop into the position shown in Figure 1, thereby permitting a liquid to flow upwardly through the pipe 16 into the sleeve 14, and thence around the stem 5, through the valve 6 and out of the openings 11. After the desired interval of time, upon lifting on the pin 2, the head 7 seals the lower end of the central opening through the valve 6, while the weight of the liquid above the packings 20 and 21, together with the action of spring 18, expands the packings outwardly to prevent leakage of the fluid trapped above the packings. The raising of the swab is continued to eject all of the trapped fluid from the upper end of the well.

The advantages of the present invention arise from the provision of a swab having a pin and valve permanently connected, whereby accidental separation thereof is prevented.

I claim:—

1. The method of making a pin and valve for swabs, comprising forming a pin having a reduced valve stem, placing a valve thereon, and then upsetting said stem to prevent removal of the valve, substantially as described.

2. A swab of the character described, having a combined pin and valve, said pin having a reduced intermediate portion and an integral head at each end thereof, said valve having an opening therethrough of smaller diameter than either of said heads, one of said heads being formed by upsetting after the valve has been positioned about the reduced intermediate portion.

In testimony whereof I have hereunto set my hand.

JOSEPH W. HEETER.